United States Patent
Yin et al.

(10) Patent No.: US 7,809,059 B2
(45) Date of Patent: Oct. 5, 2010

(54) METHOD AND APPARATUS FOR WEIGHTED PREDICTION ESTIMATION USING A DISPLACED FRAME DIFFERENTIAL

(75) Inventors: Peng Yin, Plainsboro, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1321 days.

(21) Appl. No.: 10/562,250

(22) PCT Filed: Jun. 23, 2004

(86) PCT No.: PCT/US2004/020028

§ 371 (c)(1),
(2), (4) Date: Dec. 22, 2005

(87) PCT Pub. No.: WO2005/004492

PCT Pub. Date: Jan. 13, 2005

(65) Prior Publication Data

US 2006/0198440 A1    Sep. 7, 2006

Related U.S. Application Data

(60) Provisional application No. 60/482,301, filed on Jun. 25, 2003.

(51) Int. Cl.
H04N 7/32 (2006.01)
H04N 7/50 (2006.01)

(52) U.S. Cl. .............................. 375/240.12; 375/240.16

(58) Field of Classification Search ............ 375/240.12, 375/240.16; 382/236, 238
See application file for complete search history.

(56) References Cited

U.S. PATENT DOCUMENTS 5,355,378 A    10/1994    Ohta (Continued)

FOREIGN PATENT DOCUMENTS

EP    0 511 778 A2    11/1992

(Continued)

OTHER PUBLICATIONS

Patent Abstract of Japan; "Video Coding Method, Video Coder and Motion Vector Detector"; Patent application No. 11196235; Nov. 4, 2000; Matsushita Electric Ind. Co. Ltd.

(Continued)

*Primary Examiner*—Scott A Rogers
(74) *Attorney, Agent, or Firm*—Robert D. Shedd; Paul P. Kiel; Guy H. Eriksen (57) ABSTRACT

A video encoder and corresponding methods are provided for weighted prediction estimation using a displaced frame difference or differential, the encoder embodying a method for receiving a substantially uncompressed image block, assigning a weighting factor for the image block corresponding to a particular reference picture having a corresponding index, computing motion vectors corresponding to the difference between the image block and the particular reference picture, motion compensating the particular reference picture in correspondence with the motion vectors, multiplying the motion compensated reference picture by the assigned weighting factor to form a weighted motion compensated reference picture, subtracting the weighted motion compensated reference picture from the substantially uncompressed image block, and encoding a signal indicative of the difference between the substantially uncompressed image block and the weighted motion compensated reference picture along with the corresponding index of the particular reference picture.

28 Claims, 5 Drawing Sheets

U.S. PATENT DOCUMENTS

| | | | |
|---|---|---|---|
| 5,438,374 A | 8/1995 | Yan | |
| 5,740,283 A | 4/1998 | Meeker | |
| 7,376,186 B2 * | 5/2008 | Boyce et al. | 375/240.15 |
| 7,466,774 B2 * | 12/2008 | Boyce | 375/240.13 |
| 7,515,637 B2 * | 4/2009 | Payson | 375/240.16 |
| 2004/0008783 A1 * | 1/2004 | Boyce | 375/240.16 |
| 2005/0129126 A1 * | 6/2005 | Jeon | 375/240.16 |
| 2008/0225946 A1 * | 9/2008 | Yin et al. | 375/240.12 |
| 2008/0253456 A1 * | 10/2008 | Yin et al. | 375/240.16 |
| 2009/0010330 A1 * | 1/2009 | Tourapis et al. | 375/240.12 |
| 2009/0086816 A1 * | 4/2009 | Leontaris et al. | 375/240.03 |
| 2009/0168886 A1 * | 7/2009 | Ikeda et al. | 375/240.16 |
| 2009/0238269 A1 * | 9/2009 | Pandit et al. | 375/240.12 |
| 2009/0257492 A1 * | 10/2009 | Andersson et al. | 375/240.12 |
| 2009/0304068 A1 * | 12/2009 | Pandit et al. | 375/240.01 |
| 2010/0086027 A1 * | 4/2010 | Panchal et al. | 375/240.12 |

FOREIGN PATENT DOCUMENTS

| | | |
|---|---|---|
| WO | WO 2004/008642 A2 | 1/2004 |
| WO | WO 2004/008761 A1 | 1/2004 |
| WO | WO 2004/008762 A1 | 1/2004 |
| WO | WO 2004/032357 A1 | 4/2004 |
| WO | WO 2004/054225 A2 | 6/2004 |

OTHER PUBLICATIONS

Akio Yoneyama, Yosuke Hizume, and Yasuyuki Nakajima; Fast Dissolve Operations for MPEG Video Contents; Proceedings 2000 International Conference on Image Processing; Sep. 10, 2000; vol. 2 and 3; pp. 291-294.

Seung Hwan Kim, Yong Kwan Kim, and Sang-Uk Lee, Adaptive Multiple Reference Frame Based Scalable Video Coding Algorithm; Proceedings 2002 International Conference on Image Processing; Sep. 22, 2002; vol. 2 of 3; pp. 33-36.

Search Report dated Dec. 14, 2004.

* cited by examiner

METHOD AND APPARATUS FOR WEIGHTED PREDICTION ESTIMATION USING A DISPLACED FRAME DIFFERENTIAL

CROSS-REFERENCE TO RELATED APPLICATION

This application claims the benefit, under 35 U.S.C. §365 of International Application PCT/US04/20028, filed Jun. 23, 2004, which was published in accordance with PCT Article 21(2) on Jan. 13, 2005 in English and which claims the benefit of U.S. provisional patent application No. 60/482,301, filed Jun. 25, 2003.

FIELD OF THE INVENTION

The present invention is directed towards video encoders and decoders, and more particularly, towards an apparatus and method for weighted prediction estimation.

BACKGROUND OF THE INVENTION

The JVT standard (also known as H.264 and MPEG AVC) is the first video compression standard to adopt a Weighted Prediction ("WP") feature. In video compression standards prior to JVT, such as MPEG-1, 2 and 4, when a single reference picture prediction was used for predictive ("P") pictures or slices, the prediction was not scaled. When bi-directional prediction was used for bi-predictive ("B") pictures or slices, predictions were formed from two different pictures, and then the two predictions were averaged together, using equal weighting factors of (½, ½), to form a single averaged prediction. In JVT, multiple reference pictures may be used for inter-prediction, with a reference picture index coded to indicate which of the multiple reference pictures is used.

In P pictures or slices, only single directional prediction is used, and the allowable reference pictures are managed in list 0. In B pictures or slices, two lists of reference pictures are managed, list 0 and list 1. In B pictures or slices, single directional prediction using either list 0 or list 1 is allowed, or bi-prediction using both list 0 and list 1 is allowed. When bi-prediction is used, the list 0 and the list 1 predictors are averaged together to form a final predictor. Thus, the JVT WP tool allows arbitrary multiplicative weighting factors and additive offsets to be applied to reference picture predictions in both P and B pictures.

Weighted prediction is supported in the Main and Extended profiles of the JVT standard. Use of weighted prediction is indicated in the picture parameter set for P, SP (switching P) and B slices. There are two WP modes—explicit mode, which is supported in P, SP, and B slices, and implicit mode, which is supported in B slices only.

Explicit Mode

In explicit mode, the WP parameters are coded in the slice header. A multiplicative weighting factor and additive offset for each color component may be coded for each of the allowable reference pictures in list 0 for P slices and B slices. However, different macroblocks in the same picture can use different weighting factors even when predicted from the same reference picture store. This can be accomplished by using reference picture reordering and memory management control operation ("MMCO") commands to associate more than one reference picture index with a particular reference picture store.

The same weighting parameters that are used for single prediction are used in combination for bi-prediction. The final inter prediction is formed for the pixels of each macroblock or macroblock partition, based on the prediction type used. For single directional prediction from list 0, $$SampleP = \text{Clip1}(((SampleP0 \cdot W_0 + 2^{LWD-1}) >> LWD) + O_0) \text{ and for single directional prediction from list 1,} \quad (1)$$

$$SampleP = \text{Clip1}(((SampleP1 \cdot W_1 + 2^{LWD-1}) >> LWD) + O_1) \text{ and for bi-prediction,} \quad (2)$$

$$SampleP = \text{Clip1}(((SampleP0 \cdot W_0 + SampleP1 \cdot W_1 + 2^{LWD}) >> (LWD+1)) + (O_0 + O_1 + 1) >> 1) \quad (3)$$

where Clip1 ( ) is an operator that clips to the range [0, 255], $W_0$ and $O_0$ are the list 0 reference picture weighting factor and offset, and $W_1$ and $O_1$ are the list 1 reference picture weighting factor and offset, and LWD is the log weight denominator rounding factor. SampleP0 and SampleP1 are the list 0 and list 1 initial predictors, and SampleP is the weighted predictor.

Implicit Mode

In WP implicit mode, weighting factors are not explicitly transmitted in the slice header, but instead are derived based on relative distances between the current picture and the reference pictures. Implicit mode is used only for bi-predictively coded macroblocks and macroblock partitions in B slices, including those using direct mode. The same formula for bi-prediction as given in the preceding explicit mode section for bi-prediction is used, except that the offset values $O_0$ and $O_1$ are equal to zero, and the weighting factors $W_0$ and $W_1$ are derived using the formulas below.

$$X = (16384 + (TD_D >> 1))/TDD$$

$$Z = \text{clip3}(-1024, 1023, (TD_B \cdot X + 32) >> 6)$$

$$W_1 = Z >> 2 \quad W_0 = 64 - W_1 \quad (4)$$

This is a division-free, 16-bit safe operation implementation of $$W_1 = (64 * TD_D)/TD_B \quad (5)$$

where $TD_B$ is temporal difference between the list 1 reference picture and the list 0 reference picture, clipped to the range [−128, 127] and $TD_B$ is difference of the current picture and the list 0 reference picture, clipped to the range [−128, 127].

Approaches for application of weight parameters are described by equations 6 through 8.

For simplicity, we write weighted prediction for list 0 prediction as $$SampleP = SampleP0 \cdot w_0 + o_0, \quad (6)$$

For simplicity, we write weighted prediction for list 1 prediction as $$SampleP = SampleP1 \cdot w_1 + o_1, \quad (7)$$

and for bi-prediction $$SampleP = (SampleP0 \cdot w_0 + SampleP1 \cdot w_1 + o_0 + o_1)/2, \quad (8)$$

where $w_i$ is weighting factor and $o_i$ is weighting offset.

Accordingly, what is needed is an apparatus and new class of methods for determining weighted prediction parameters.

SUMMARY OF THE INVENTION

These and other drawbacks and disadvantages of the prior art are addressed by an apparatus and method for weighted prediction estimation using a displaced frame differential.

A video encoder and corresponding methods are provided for weighted prediction estimation using a displaced frame difference or differential, the encoder embodying a method for receiving a substantially uncompressed image block, assigning a weighting factor and offset for the image block corresponding to a particular reference picture having a corresponding index, computing motion vectors corresponding to the difference between the image block and the particular reference picture, motion compensating the particular reference picture in correspondence with the motion vectors, multiplying the motion compensated reference picture by the assigned weighting factor to form a weighted motion compensated reference picture, subtracting the weighted motion compensated reference picture from the substantially uncompressed image block, and encoding a signal indicative of the difference between the substantially uncompressed image block and the weighted motion compensated reference picture along with the corresponding index of the particular reference picture.

These and other aspects, features and advantages of the present invention will become apparent from the following description of exemplary embodiments, which is to be read in connection with the accompanying drawings.

BRIEF DESCRIPTION OF THE DRAWINGS

The present invention may be better understood with reference to the following exemplary figures, in which.

DETAILED DESCRIPTION OF PREFERRED EMBODIMENTS

The JVT video coding standard includes a Weighted Prediction (WP) tool in its Main and Extended profiles. In WP, a multiplicative weighting factor and an additive offset are applied to the motion compensated prediction. WP is particularly useful for coding fading sequences. In explicit mode, a weighting factor and offset may be coded in the slice header for each allowable reference picture index. In implicit mode, the weighting factors are not coded but are derived based on the relative picture order count (POC) distances of the two reference pictures.

Statistical approaches such as linear regression can be used to estimate the weighting parameters. It is also possible for the weighting factor to be estimated as the ratio between the average value of the pixels in the current picture divided by the average value of the pixels in the reference picture while the weighting offset is set to zero.

The present description illustrates the principles of the invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

Figure 1:
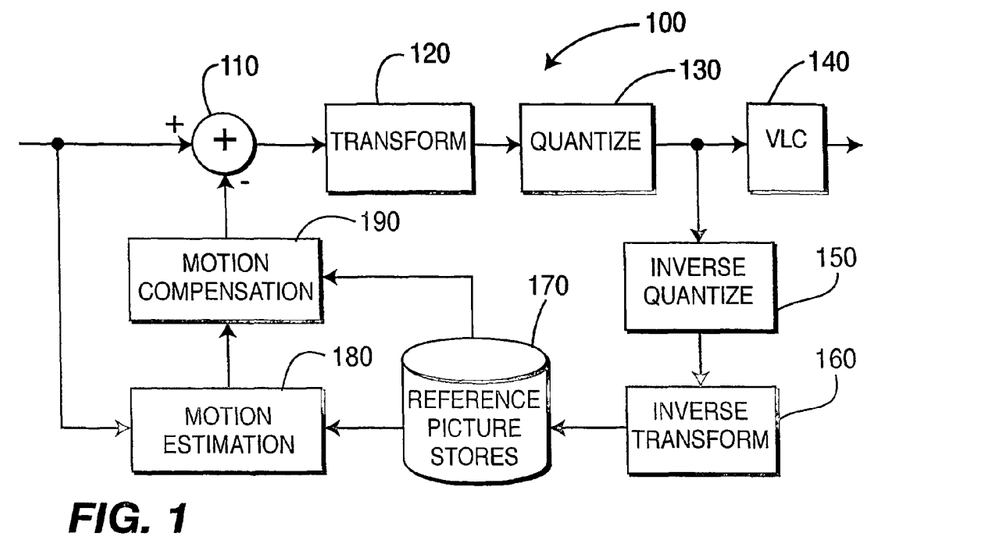
FIG. 1 shows a block diagram for a video encoder.

As shown in FIG. 1, a video encoder is indicated generally by the reference numeral 100. An input to the encoder 100 is connected in signal communication with a non-inverting input of a summing junction 110. The output of the summing junction 110 is connected in signal communication with a block transform function 120. The transformer 120 is connected in signal communication with a quantizer 130. The output of the quantizer 130 is connected in signal communication with a variable length coder ("VLC") 140, where the output of the VLC 140 is an externally available output of the encoder 100.

The output of the quantizer 130 is further connected in signal communication with an inverse quantizer 150. The inverse quantizer 150 is connected in signal communication with an inverse block transformer 160, which, in turn, is connected in signal communication with a reference picture store 170. A first output of the reference picture store 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture store 170 is connected in signal communication with a second input of the motion compensator 190. The output of the motion compensator 190 is connected in signal communication with an inverting input of the summing junction 110.

Figure 2:
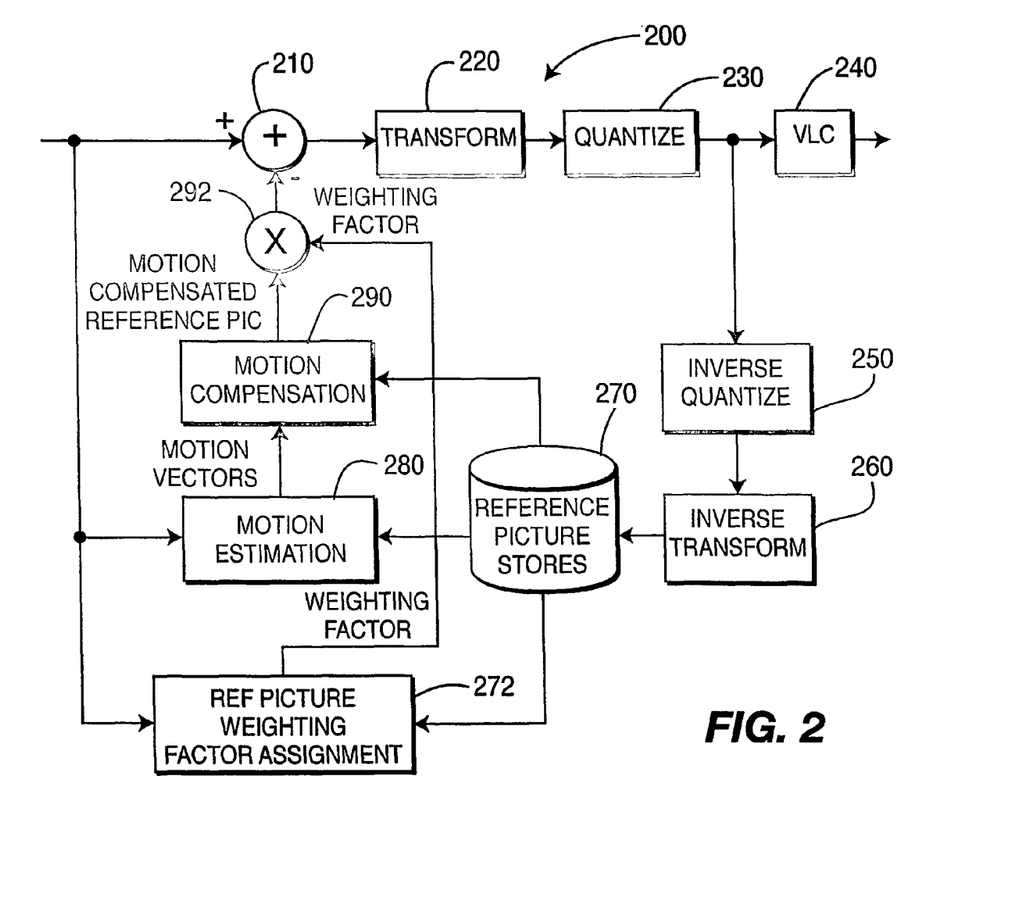
FIG. 2 shows a block diagram for a video encoder with implicit reference picture weighting.

Turning to FIG. 2, a video encoder with implicit reference picture weighting is indicated generally by the reference numeral 200. An input to the encoder 200 is connected in signal communication with a non-inverting input of a summing junction 210. The output of the summing junction 210 is connected in signal communication with a block transformer 220. The transformer 220 is connected in signal communication with a quantizer 230. The output of the quantizer 230 is connected in signal communication with a VLC 240, where the output of the VLC 240 is an externally available output of the encoder 200.

The output of the quantizer 230 is further connected in signal communication with an inverse quantizer 250. The inverse quantizer 250 is connected in signal communication with an inverse block transformer 260, which, in turn, is connected in signal communication with a reference picture store 270. A first output of the reference picture store 270 is connected in signal communication with a first input of a reference picture weighting factor assignor 272. The input to the encoder 200 is further connected in signal communication with a second input of the reference picture weighting factor assignor 272. A second output of the reference picture store 270 is connected in signal communication with an input to the motion estimator 280.

The input to the encoder 200 is further connected in signal communication with a second input of the motion estimator 280. The output of the motion estimator 280, which is indicative of motion vectors, is connected in signal communication with a first input of a motion compensator 290. A third output of the reference picture store 270 is connected in signal communication with a second input of the motion compensator 290. The output of the motion compensator 290, which is indicative of a motion compensated reference picture, is connected in signal communication with a first input of a multiplier (or reference picture weighting applicator) 292. Although an exemplary multiplier embodiment is shown, the reference picture weighting applicator 292 may be implemented in alternate ways, such as, for example, by a shift register. The output of the reference picture weighting factor assignor 272, which is indicative of a weighting factor, is connected in signal communication with a second input of the reference picture weighting applicator 292. The output of the reference picture weighting applicator 292 is connected in signal communication with an inverting input of the summing junction 210.

Figure 3:
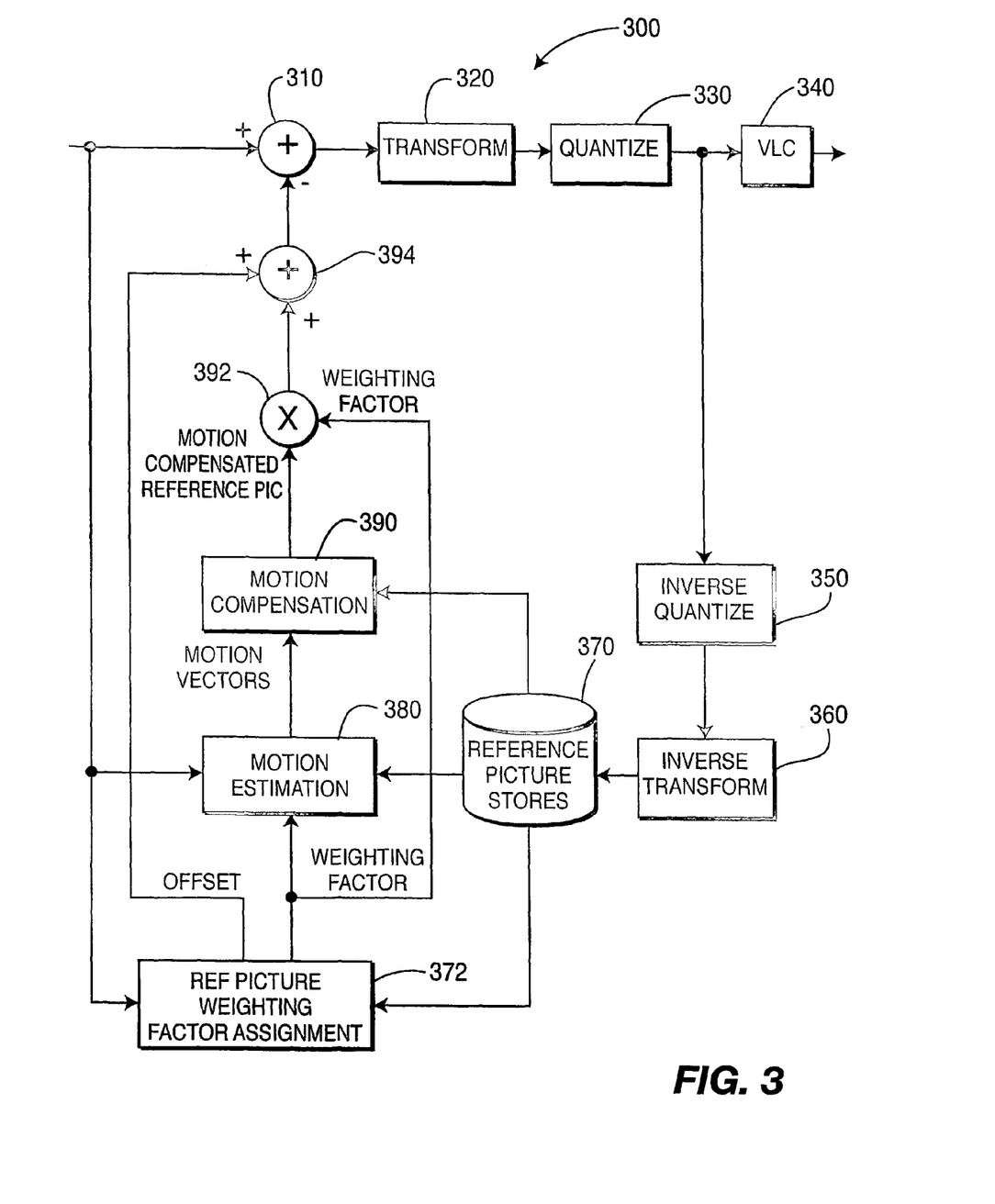
FIG. 3 shows a block diagram for a video encoder with explicit reference picture weighting.

Turning to FIG. 3, a video encoder with explicit reference picture weighting is indicated generally by the reference numeral 300. An input to the encoder 300 is connected in signal communication with a non-inverting input of a summing junction 310. The output of the summing junction 310 is connected in signal communication with a block transformer 320. The transformer 320 is connected in signal communication with a quantizer 330. The output of the quantizer 330 is connected in signal communication with a VLC 340, where the output of the VLC 340 is an externally available output of the encoder 300.

The output of the quantizer 330 is further connected in signal communication with an inverse quantizer 350. The inverse quantizer 350 is connected in signal communication with an inverse block transformer 360, which, in turn, is connected in signal communication with a reference picture store 370. A first output of the reference picture store 370 is connected in signal communication with a first input of a reference picture weighting factor assignor 372. The input to the encoder 300 is further connected in signal communication with a second input of the reference picture weighting factor assignor 372. A first output of the reference picture weighting factor assignor 372, which is indicative of a weighting factor, is connected in signal communication with a first input of a motion estimator 380. A second output of the reference picture store 370 is connected in signal communication with a second input of the motion estimator 380.

The input to the encoder 300 is further connected in signal communication with a third input of the motion estimator 380. The output of the motion estimator 380, which is indicative of motion vectors, is connected in signal communication with a first input of a motion compensator 390. A third output of the reference picture store 370 is connected in signal communication with a second input of the motion compensator 390. The output of the motion compensator 390, which is indicative of a motion compensated reference picture, is connected in signal communication with a first input of a multiplier (or reference picture weighting applicator) 392. The first output of the reference picture weighting factor assignor 372, which is indicative of a weighting factor, is also connected in signal communication with a second input of the reference picture weighting applicator 392. The output of the reference picture weighting applicator 392 is connected in signal communication with a first non-inverting input of a summing junction 394. A second output of the reference picture weighting factor assignor 372, which is indicative of an offset, is connected in signal communication with a second non-inverting input of the summing junction 394. The output of the summing junction 394 is connected in signal communication with an inverting input of the summing junction 310.

Figure 4:
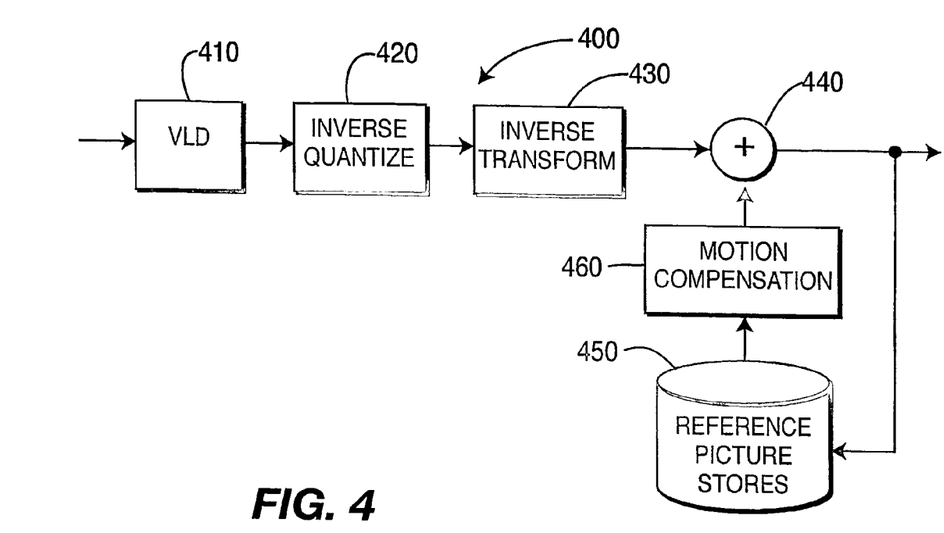
FIG. 4 shows a block diagram for a video decoder.

As shown in FIG. 4, a video decoder is indicated generally by the reference numeral 400. The video decoder 400 includes a variable length decoder ("VLD") 410 connected in signal communication with an inverse quantizer 420. The inverse quantizer is connected with an inverse transform 430. The inverse transform is connected in signal communication with a first input terminal of an adder or summing junction 440, where the output of the summing junction 440 provides the output of the video decoder 400. The output of the summing junction 440 is connected in signal communication with a reference picture store 450. The reference picture store 450 is connected in signal communication with a motion compensator 460, which is connected in signal communication with a second input terminal of the summing junction 440.

Figure 5:
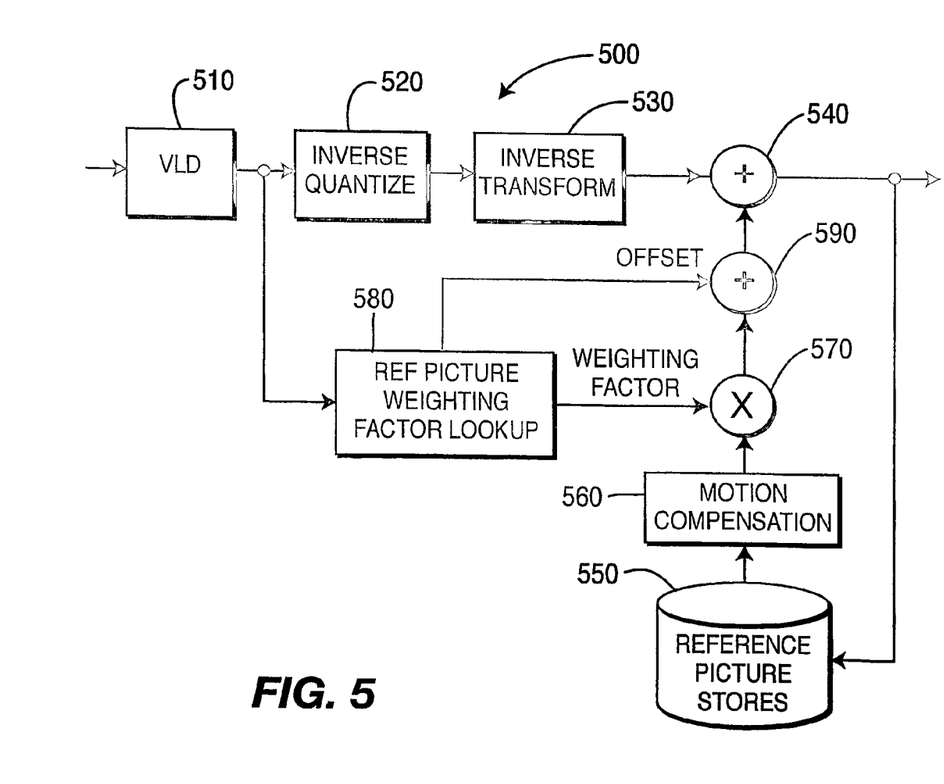
FIG. 5 shows a block diagram for a video decoder with explicit reference picture weighting.

Turning to FIG. 5, a video decoder for explicit reference picture weighting is indicated generally by the reference numeral 500. The video decoder 500 includes a VLD 510 connected in signal communication with an inverse quantizer 520. The inverse quantizer 520 is connected in signal communication with an inverse transformer 530. The inverse transformer 530 is connected in signal communication with a first input terminal of a summing junction 540, where the output of the summing junction 540 provides the output of the video decoder 500. The output of the summing junction 540 is connected in signal communication with a reference picture store 550. The reference picture store 550 is connected in signal communication with a motion compensator 560, which is connected in signal communication with a first input of a multiplier (or reference picture weighting applicator) 570. As will be recognized by those of ordinary skill in the pertinent art, the decoder 500 for explicit weighted prediction may also be used for implicit weighted prediction.

The VLD 510 is further connected in signal communication with a reference picture weighting factor lookup 580 for providing a coefficient index to the lookup 580. A first output of the lookup 580 is for providing a weighting factor, and is connected in signal communication to a second input of the reference picture weighting applicator 570. The output of the reference picture weighting applicator 570 is connected in signal communication to a first input of a summing junction 590. A second output of the lookup 580 is for providing an offset, and is connected in signal communication to a second input of the summing junction 590. The output of the summing junction 590 is connected in signal communication with a second input terminal of the summing junction 540.

Figure 6:
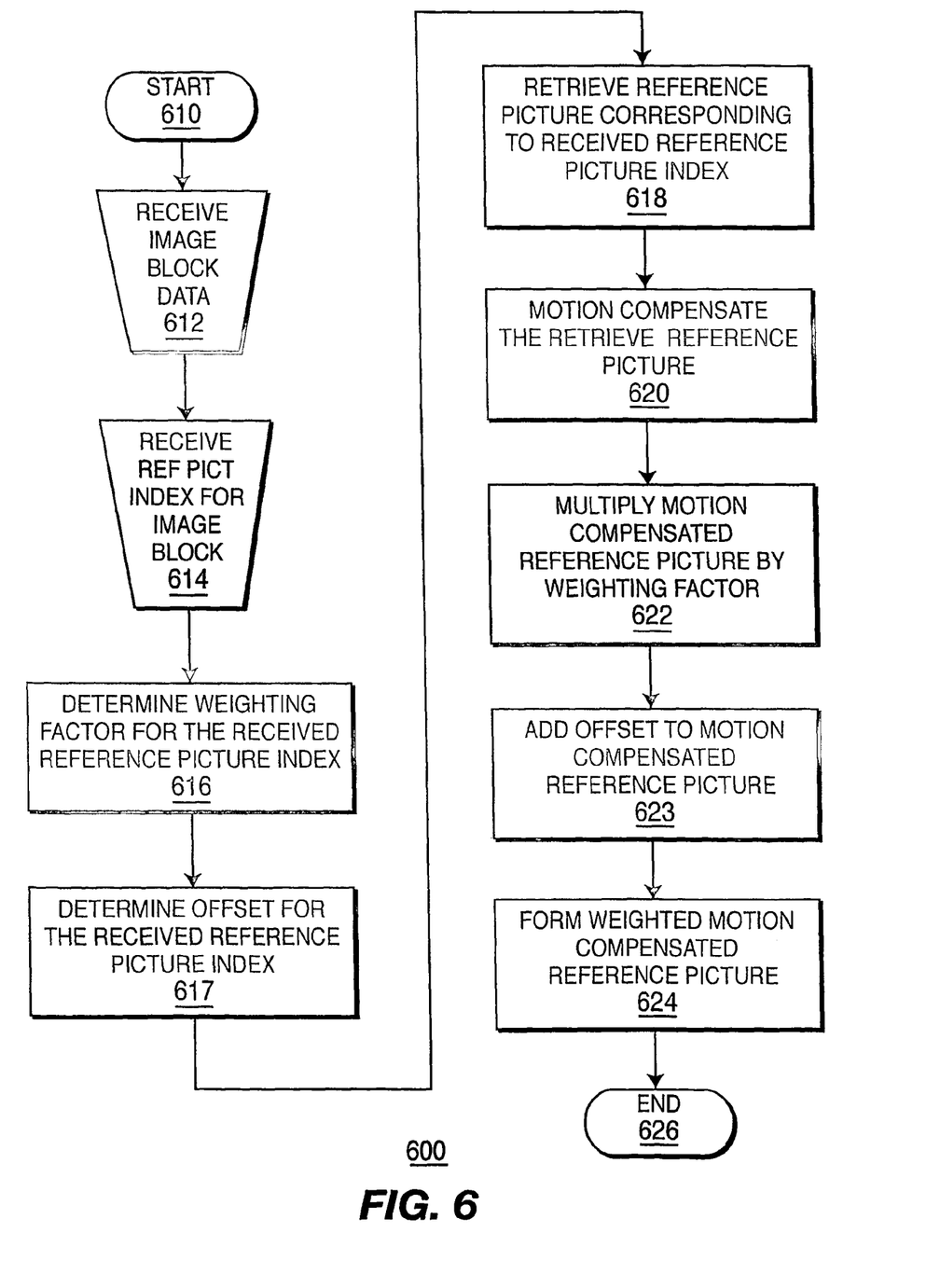
FIG. 6 shows a flowchart for an exemplary decoding process in accordance with the principles of the present invention.

Turning now to FIG. 6, an exemplary process for decoding video signal data for an image block is indicated generally by the reference numeral 600. The process includes a start block 610 that passes control to an input block 612. The input block 612 receives the image block compressed data, and passes control to an input block 614. The input block 614 receives at least one reference picture index with the data for the image block, each reference picture index corresponding to a particular reference picture. The input block 614 passes control to a function block 616, which determines a weighting factor corresponding to each of the received reference picture indices, and passes control to an optional function block 617. The optional function block 617 determines an offset corresponding to each of the received reference picture indices, and passes control to a function block 618. The function block 618 retrieves a reference picture corresponding to each of the received reference picture indices, and passes control to a function block 620. The function block 620, in turn, motion compensates the retrieved reference picture, and passes control to a function block 622. The function block 622 multiplies the motion compensated reference picture by the corresponding weighting factor, and passes control to an optional function block 623. The optional function block 623 adds the motion compensated reference picture to the corresponding offset, and passes control to a function block 624. The function block 624, in turn, forms a weighted motion compensated reference picture, and passes control to an end block 626.

Figure 7:
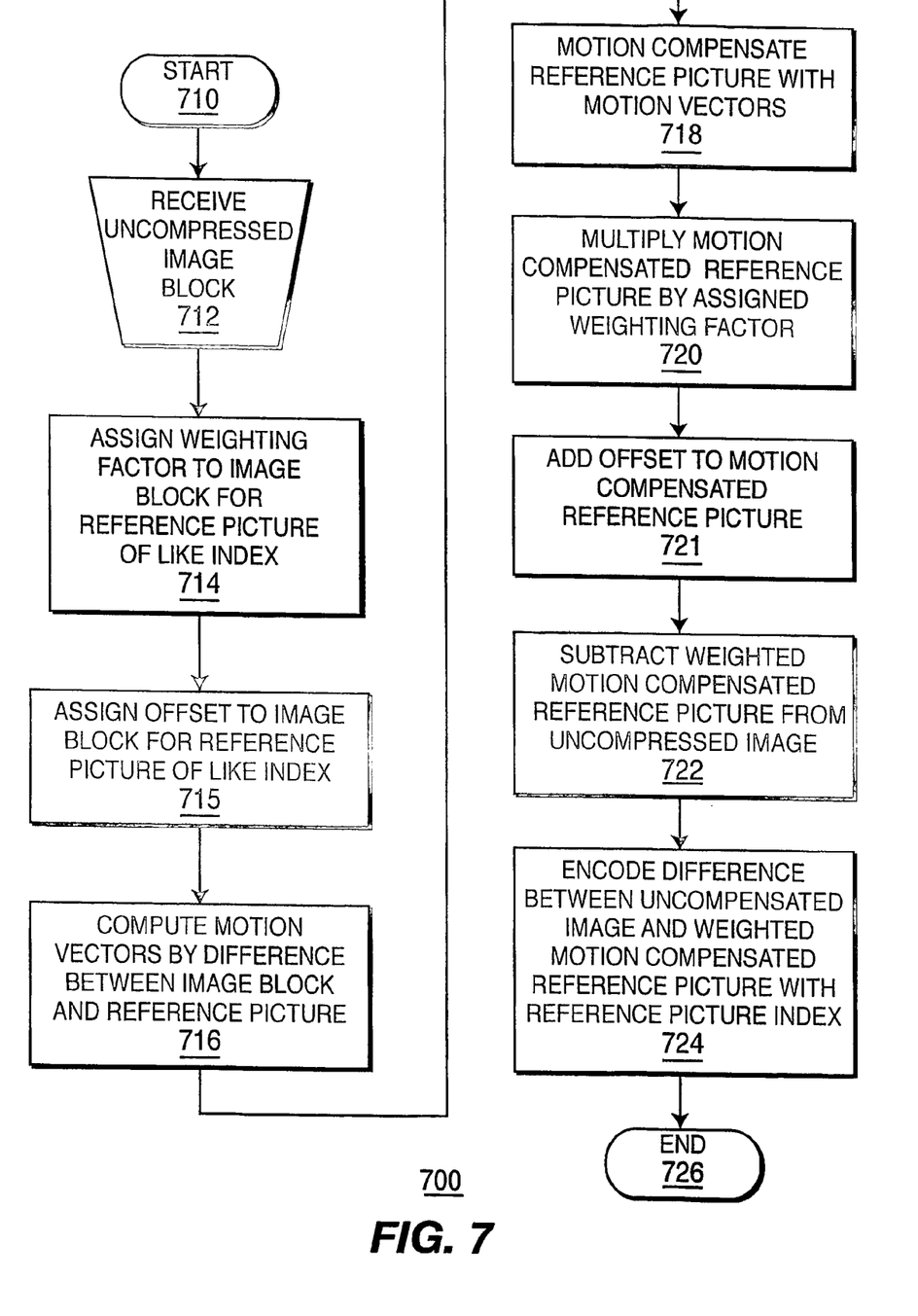
FIG. 7 shows a flowchart for an exemplary encoding process in accordance with the principles of the present invention.

As shown in FIG. 7, an exemplary process for encoding video signal data for an image block is indicated generally by the reference numeral 700. The process includes a start block 710 that passes control to an input block 712. The input block 712 receives substantially uncompressed image block data, and passes control to a function block 714. The function block 714 assigns a weighting factor for the image block corresponding to a particular reference picture having a corresponding index. The function block 714 passes control to an optional function block 715. The optional function block 715 assigns an offset for the image block corresponding to a particular reference picture having a corresponding index. The optional function block 715 passes control to a function block 716, which computes motion vectors corresponding to the difference between the image block and the particular reference picture, and passes control to a function block 718. The function block 718 motion compensates the particular reference picture in correspondence with the motion vectors, and passes control to a function block 720. The function block 720, in turn, multiplies the motion compensated reference picture by the assigned weighting factor to form a weighted motion compensated reference picture, and passes control to an optional function block 721. The optional function block 721, in turn, adds the motion compensated reference picture to the assigned offset to form a weighted motion compensated reference picture, and passes control to a function block 722. The function block 722 subtracts the weighted motion compensated reference picture from the substantially uncompressed image block, and passes control to a function block 724. The function block 724, in turn, encodes a signal with the difference between the substantially uncompressed image block and the weighted mot on compensated reference picture along with the corresponding index of the particular reference picture, and passes control to an end block 726.

The Weighted Prediction (WP) tool has been adopted in the JVT video coding standard for the Main and Extended profiles to improve coding efficiency. In the preferred embodiments of the present invention, a new method class is presented to estimate weighting parameters.

The method of operation is based on the model to describe a dissolve or fading sequence. At its most basic, it is assumed that a dissolve or fade process can be seen as a time-varying superposition of two video streams. Let $f_k(x, y)$ denote the value of pixel (x,y) in frame k of sequence f. A dissolve from sequence g to sequence h, lasting from frame m to frame n, can therefore be described as $$f_k(x,y)=\alpha_k h(x,y)+(1-\alpha_k)g(x,y) \qquad (9)$$

For purposes of this description, also assume that there is negligible motion from sequence g to h. For compactness, we denote $f_k$ the vector formed by all the pixels of frame k. By (9), we can write $$f_a(x,y)=\alpha_a h(x,y)+(1-\alpha_a)g(x,y)$$

$$f_b(x,y)=\alpha_b h(x,y)+(1-\alpha_b)g(x,y)$$

$$f_c(x,y)=\alpha_c h(x,y)+(1-\alpha_c)g(x,y)$$

$$f_d(x,y)=\alpha_d h(x,y)+(1-\alpha_d)g(x,y)$$

where m<a,b,c,d<n, a≠b, c≠d
and we can derive the following equation:

$$f_d - f_c = \frac{\alpha_d - \alpha_c}{\alpha_b - \alpha_a}(f_b - f_a) = \beta(f_b - f_a) \qquad (10)$$

By substituting the frame index into (10), we can derive the formula of WP for bi-prediction. For example if we denote the current frame index as k, the reference frame for list 0 prediction as $k-l_0$, and the reference frame for list 1 prediction as $k+l_1$, then from (10), we will get $$f_{k+l_1} - f_k = \beta(f_k - f_{k-l_0}), \qquad (11)$$

so $$f_k = \frac{1}{\beta+1} f_{k+l_1} + \frac{\beta}{\beta+1} f_{k-l_0} \qquad (12)$$

Comparing with equation (6) (7) and (8), we can set $$w_0 = \frac{2\beta}{\beta+1} \text{ and } w_1 = \frac{2}{\beta+1}.$$

So the only parameter we need to estimate is $\beta$. By equation (11), we have $$\beta = \frac{f_{k+t_1} - f_k}{f_k - f_{k-t_0}}. \tag{13}$$

That is, $\beta$ is the ratio of the picture difference, or the weighting factor. There are several ways to estimate $\beta$.

Method Embodiment 1: Using equation (13), a method is illustrated in which the determination of the weighting factor comprises calculating an expectation of the frame difference of a current picture with a preceding picture and also calculating an expectation of frame difference of the current picture with a subsequent picture. In the instant embodiment of the present invention, the value of $\beta$ is the ratio between these two expectations. The two weights, $w_o$ and $w_1$, are computed based on $\beta$.

$$\beta \approx \frac{E(f_{k+t_1} - f_k)}{E(f_k - f_{k-t_0})}. \tag{14}$$

Method Embodiment 2: By equation (11), linear regression in [3] or other statistical approaches as in [6] can be used.

Method Embodiment 3: Curve fitting can be applied.

When estimating $\beta$, it is not necessary to use all the pixels in the image. A subsampled image can be used to save computations.

In equation (10), we assume there is no motion in the sequence. To take the motion into consideration, an iterative method is used as follows.

Step 1: initially compute $\beta_{n=0}$ using frame difference;
Step 2: n=n+1;
Step 3: estimate motion vector using Weighted Prediction by $\beta_n$, i.e., the motion vector is estimated between current picture and weighted reference picture whose pixel value is multiplied by $\beta_n$;
Step 4: compute $\beta_{n+1}$ using motion compensated frame difference;
Step 5: if $|\beta_{n+1}-\beta_n|<\epsilon$, or n>N, stop; otherwise go to Step 2.

After the weighting factor is computed, the optional weighting offset can be calculated using equation (6) (7). By taking expectation on both sides, we can derive the weighting offset as the average difference between current picture and weighted motion compensated reference picture $$o_0 = E(\text{Sample}P) - E(\text{sample}P0 \cdot w_0). \tag{15}$$

$$o_1 = E(\text{Sample}P) - E(\text{sample}P1 \cdot w_1). \tag{16}$$

These and other features and advantages of the present invention may be readily ascertained by one of ordinary skill in the pertinent art based on the teachings herein. It is to be understood that the principles of the present invention may be implemented in various forms of hardware, software, firmware, special purpose processors, or combinations thereof. Most preferably, the principles of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A video encoder for encoding video signal data of a current picture in association with at least one reference picture, the encoder comprising:
a reference picture weighting applicator; and
a reference picture weighting factor unit responsive to a frame difference and in signal communication with the reference picture weighting applicator for assigning a weighting factor corresponding to the at least one reference picture.

2. A video encoder as defined in claim 1 wherein the reference picture weighting factor unit is responsive to a motion compensated frame difference.

3. A video encoder as defined in claim 1 wherein the frame difference is calculated between the current picture and the at least one reference picture.

4. A video encoder as defined in claim 1 wherein the reference picture weighting factor unit is responsive to a plurality of reference pictures corresponding to any sequence.

5. A video encoder as defined in claim 2 wherein the reference picture weighting factor unit is further responsive to weighting factors iteratively derived from the motion compensated frame difference.

6. A video encoder as defined in claim 2 wherein the reference picture weighting factor unit is further responsive to weighting factors derived from at least one of statistical methods or curve fitting.

7. A video encoder as defined in claim 6 wherein the statistical methods comprise linear regression.

8. A video encoder as defined in claim 1 wherein the reference picture weighting factor unit applies a weighting offset derived as the average difference between the current picture and a weighted motion compensated reference picture.

9. A video encoder as defined in claim 4, further comprising a motion compensation unit in signal communication with the reference picture weighting applicator for providing at least one of a motion compensated fade-out start picture and a motion compensated fade-in end picture responsive to the reference picture weighting factor unit for coding at least one fading sequence picture.

10. A video encoder as defined in claim 9, further comprising a reference picture store in signal communication with each of the reference picture weighting factor unit and the motion compensation unit for storing each of the fade-out start picture and the fade-in end picture.

11. A video encoder as defined in claim 9 wherein the reference picture weighting applicator applies a weighting factor selected by the reference picture weighting factor unit to at least one of the motion compensated fade-out start picture and the motion compensated fade-in end picture.

12. A video encoder as defined in claim 11 usable with bi-predictive picture predictors, the encoder further comprising prediction means for forming first and second predictors from the weighted and motion compensated fade-out start and fade-in end pictures, respectively.

13. A video encoder as defined in claim 12 wherein the weighted and motion compensated fade-out start and fade-in end pictures, respectively, are each from opposite directions relative to all of the at least one cross-fade pictures.

14. A video encoder as defined in claim 1, further comprising a motion estimation unit in signal communication with the reference picture weighting factor unit for providing motion estimation responsive to a weighting factor in an explicit mode of operation.

15. A video encoder as defined in claim 8, further comprising a summing unit in signal communication with the reference picture weighting factor unit for applying an offset to the weighted motion compensated reference picture in an explicit mode of operation.

16. A method for encoding video signal data for an image block, the method comprising:
receiving a substantially uncompressed image block;
assigning a weighting factor for the image block corresponding to a particular reference picture having a corresponding index, using frame differences to determine the weighting factor;
computing motion vectors corresponding to the difference between the image block and the particular reference picture;
motion compensating the particular reference picture in correspondence with the motion vectors;
adjusting the motion compensated reference picture by the assigned weighting factor to form a weighted motion compensated reference picture;
subtracting the weighted motion compensated reference picture from the substantially uncompressed image block; and
encoding a signal indicative of the difference between the substantially uncompressed image block and the weighted motion compensated reference picture along with the corresponding index of the particular reference picture.

17. A method as defined in claim 16 wherein determining a weighting factor comprises calculating an expectation of the frame difference of a current picture with a preceding picture and calculating an expectation of frame difference of the current picture with a subsequent picture.

18. A method as defined in claim 16 wherein determining a weighting factor comprises performing a linear regression on a sequence indicative of the current picture.

19. A method as defined in claim 16 wherein determining a weighting factor comprises fitting a curve to a sequence indicative of the current picture.

20. A method as defined in claim 19, further comprising subsampling the image to save computations.

21. A method as defined in claim 19, further comprising iterating a weighting factor to take the motion into consideration.

22. A method as defined in claim 21 wherein iterating comprises:
computing a first iteration using at least one of a frame difference and a displaced frame differential;
estimating a motion vector between a current picture and a weighted reference picture using Weighted Prediction; and
computing the weighting factor using at least one of a motion compensated frame difference and a displaced frame differential.

23. A method as defined in claim 16, further comprising determining a weighting offset.

24. A method as defined in claim 23 wherein determining the weighting offset comprises:
taking an expectation on both sides; and
deriving the weighting offset as the average difference between the current picture and weighted motion compensated reference picture.

25. A method as defined in claim 16 wherein computing motion vectors comprises:
testing within a search region for every displacement within a pre-determined range of offsets relative to the image block;
calculating at least one of the sum of the absolute difference and the mean squared error of each pixel in the image block with a motion compensated reference picture; and
selecting the offset with the lowest sum of the absolute difference and mean squared error as the motion vector.

26. A method as defined in claim 16 wherein bi-predictive picture predictors are used, the method further comprising:
assigning a second weighting factor for the image block corresponding to a second particular reference picture having a second corresponding index;
computing motion vectors corresponding to the difference between the image block and the second particular reference picture;
motion compensating the second particular reference picture in correspondence with the motion vectors;
multiplying the motion compensated second reference picture by the assigned second weighting factor to form a weighted motion compensated second reference picture;
subtracting the weighted motion compensated second reference picture from the substantially uncompressed image block; and
encoding a signal indicative of the difference between the substantially uncompressed image block and the weighted motion compensated second reference picture along with the corresponding index of the second particular reference picture.

27. A method as defined in claim 26 wherein the two different reference pictures are both from the same direction relative to the image block.

28. A method as defined in claim 26 wherein computing motion vectors comprises:
testing within a search region for every displacement within a pre-determined range of offsets relative to the image block;

calculating at least one of the sum of the absolute difference or the mean squared error of each pixel in the image block with a first motion compensated reference picture corresponding to the first predictor;

selecting an offset with the lowest sum of the absolute difference or mean squared error as the motion vector for the first predictor;

calculating at least one of the sum of the absolute difference or the mean squared error of each pixel in the image block with a second motion compensated reference picture corresponding to the second predictor; and selecting an offset with the lowest sum of the absolute difference or mean squared error as the motion vector for the second predictor.

* * * * *